(12) United States Patent
Miyamoto et al.

(10) Patent No.: US 11,003,250 B2
(45) Date of Patent: May 11, 2021

(54) ELECTRONIC DEVICE

(71) Applicant: FUJITSU LIMITED, Kawasaki (JP)

(72) Inventors: Akinori Miyamoto, Sagamihara (JP); Kiyoshi Taninaka, Ebina (JP); Yuichi Kamata, Isehara (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/457,680

(22) Filed: Jun. 28, 2019

(65) Prior Publication Data

US 2019/0324545 A1    Oct. 24, 2019

Related U.S. Application Data

(63) Continuation of application No. PCT/JP2017/001676, filed on Jan. 19, 2017.

(51) Int. Cl.
*G06F 3/01* (2006.01)
*G06F 3/044* (2006.01)

(52) U.S. Cl.
CPC ............. *G06F 3/016* (2013.01); *G06F 3/044* (2013.01)

(58) Field of Classification Search
CPC .................................. G06F 3/016; G06F 3/044
USPC .................. 345/173, 174; 382/103; 396/529; 701/533
See application file for complete search history.

(56) References Cited

U.S. PATENT DOCUMENTS

| | | | |
|---|---|---|---|
| 2010/0095769 A1* | 4/2010 | Matsumoto | G01C 19/5726 73/504.12 |
| 2010/0171715 A1 | 7/2010 | Peterson et al. | |
| 2011/0102343 A1 | 5/2011 | Imai et al. | |
| 2011/0205173 A1* | 8/2011 | Arai | G06F 3/044 345/173 |

(Continued)

FOREIGN PATENT DOCUMENTS

| | | |
|---|---|---|
| JP | 2011-096183 A | 5/2011 |
| JP | 2012-027765 A | 2/2012 |

(Continued)

OTHER PUBLICATIONS

International Search Report in PCT application No. PCT/JP2017/001676 dated Feb. 21, 2017.

(Continued)

*Primary Examiner* — Prabodh M Dharia
(74) *Attorney, Agent, or Firm* — Maschoff Brennan

(57) ABSTRACT

An electronic device includes a top panel configured to have an operation surface; a detection circuit configured to detect a position of an operation input on the operation surface; a vibrating circuit configured to be attached to the top panel to generate vibration on the operation surface; a control circuit configured to drive the vibrating circuit by a driving signal for generating natural vibration of an ultrasonic wave band on the operation surface, in which the driving of the vibrating circuit is performed such that an intensity of the natural vibration changes in accordance with the position of the operation input to the operation surface and a temporal change degree of the position; and a damping member configured to abut against a position that corresponds to a node of a standing wave generated by the natural vibration on a surface opposite to the operation surface of the top panel.

7 Claims, 19 Drawing Sheets

(56) References Cited

U.S. PATENT DOCUMENTS

| | | | |
|---|---|---|---|
| 2011/0206239 A1* | 8/2011 | Wada | A61B 5/6887 |
| | | | 382/103 |
| 2011/0262127 A1* | 10/2011 | Kawai | H04N 5/2171 |
| | | | 396/529 |
| 2011/0291976 A1* | 12/2011 | Takada | G06F 3/016 |
| | | | 345/173 |
| 2012/0099268 A1* | 4/2012 | Hartman | G06F 1/20 |
| | | | 361/679.32 |
| 2013/0090850 A1* | 4/2013 | Mays | G01C 21/3647 |
| | | | 701/533 |
| 2013/0271412 A1 | 10/2013 | Adachi et al. | |
| 2014/0028573 A1 | 1/2014 | Olien et al. | |
| 2014/0104216 A1 | 4/2014 | Adachi et al. | |
| 2014/0347322 A1* | 11/2014 | Kamata | G06F 3/041 |
| | | | 345/174 |
| 2015/0015382 A1 | 1/2015 | Aubry | |
| 2016/0349846 A1* | 12/2016 | Sugiura | G06F 3/016 |
| 2017/0173262 A1* | 6/2017 | Veltz | G16H 20/17 |
| 2017/0205882 A1* | 7/2017 | Tanaka | G06F 3/016 |
| 2018/0018022 A1* | 1/2018 | Hoshi | G06F 1/1643 |
| 2018/0052567 A1 | 2/2018 | Miyamoto et al. | |

FOREIGN PATENT DOCUMENTS

| | | | | |
|---|---|---|---|---|
| JP | 2012-514816 A | | 6/2012 | |
| JP | 2015-504211 A | | 2/2015 | |
| JP | 2015-522897 A | | 8/2015 | |
| JP | WO2015121956 | * | 8/2015 | ............ G06F 3/041 |
| WO | 2013/057940 A1 | | 4/2013 | |
| WO | 2014/057593 A1 | | 4/2014 | |
| WO | 2016/157491 A1 | | 10/2016 | |
| WO | 2016/170601 A1 | | 10/2016 | |

OTHER PUBLICATIONS

Written Opinion in PCT application No. PCT/JP2017/001676 dated Feb. 21, 2017.

Japanese Office Action dated Jul. 14, 2020 for corresponding Japanese Patent Application No. 2018-562801 with Machine Translation.

* cited by examiner

ELECTRONIC DEVICE

CROSS-REFERENCE TO RELATED APPLICATION

This application is a continuation application of International Application PCT/JP2017/001676 filed on Jan. 19, 2017 and designated the U.S., the entire contents of which are incorporated herein by reference.

FIELD

The present disclosure relates to an electronic device.

BACKGROUND

In the related art, there are haptic devices that have a compliant suspension system. The haptic device includes a housing component, a touch screen component, and at least one compliant suspension member that couples the touch screen component and the housing component to each other such that the touch screen component is movable with respect to the housing component.

The haptic device includes a piezoelectric material segment that generates a force for moving the touch screen component with respect to the housing component and is coupled to at least one surface of at least one suspension member that provides a haptic effect to a user of the touch screen component.

In response to the force generated by the piezoelectric material segment, the at least one suspension member is configured to allow movement of the touchscreen component with respect to the housing component in a first direction, and is configured to suppress movement between the touch screen component and the housing component at least in a second direction (for example, refer to Japanese National Publication of International Patent Application No. 2015-522897).

SUMMARY

According to an aspect of the embodiments, an electronic device includes a top panel configured to have an operation surface; a position detection circuit configured to detect a position of an operation input performed on the operation surface; a vibrating element circuit configured to be attached to the top panel to generate vibration on the operation surface; a drive control circuit configured to drive the vibrating element circuit by a driving signal for generating natural vibration of an ultrasonic wave band on the operation surface, in which the driving of the vibrating element circuit is performed such that an intensity of the natural vibration changes in accordance with the position of the operation input to the operation surface and a temporal change degree of the position; and a damping member configured to abut against a position that corresponds to a node of a standing wave generated by the natural vibration on a surface opposite to the operation surface of the top panel.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Incidentally, although the haptic device of the related art makes the touch screen component movable with respect to the housing component by the compliant suspension member, since the touch screen component generates vibration of various frequencies, there is a concern that noise in an audible range occurs.

Here, an object of the disclosure is to provide an electronic device in which noise in an audible range is suppressed.

Hereinafter, an embodiment to which the electronic device of the disclosure is applied will be described.

Embodiment

Figure 1:
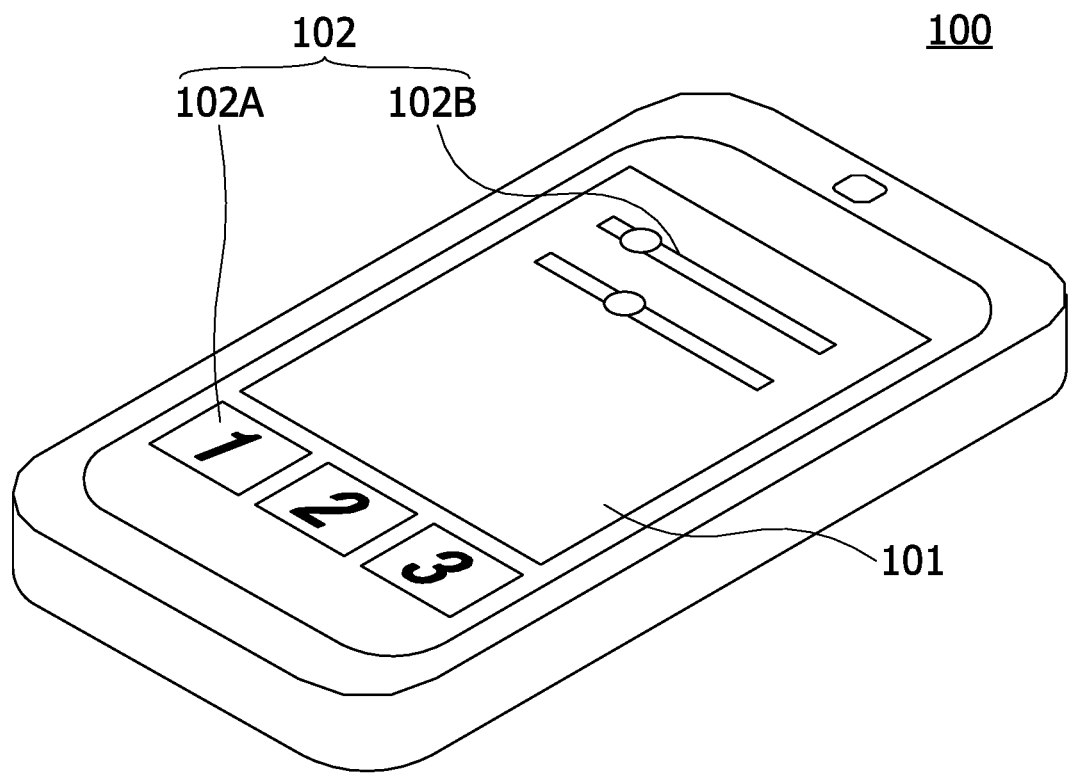
FIG. 1 is a perspective view illustrating an electronic device according to an embodiment.

FIG. 1 is a perspective view illustrating an electronic device 100 according to the embodiment.

The electronic device 100 is, for example, a smartphone terminal, a tablet computer, a game machine, or the like, which has a touch panel as an input operation unit. The electronic device 100 may be any device having a touch panel as an input operation unit, and thus may be a device installed and used at a specific place, such as a portable information terminal or an automatic teller machine (ATM). In addition, the electronic device 100 may be an on-vehicle input device.

In an input operation unit 101 of the electronic device 100, a display panel is disposed under the touch panel, and various buttons 102A, sliders 102B, and the like (hereinafter, referred to as a GUI operation unit 102) by a graphic user interface (GUI) are displayed on the display panel.

A user of the electronic device 100 normally touches the input operation unit 101 with a fingertip to operate the GUI operation unit 102.

Next, a specific configuration of the electronic device 100 will be described with reference to FIG. 2.

Figure 2:
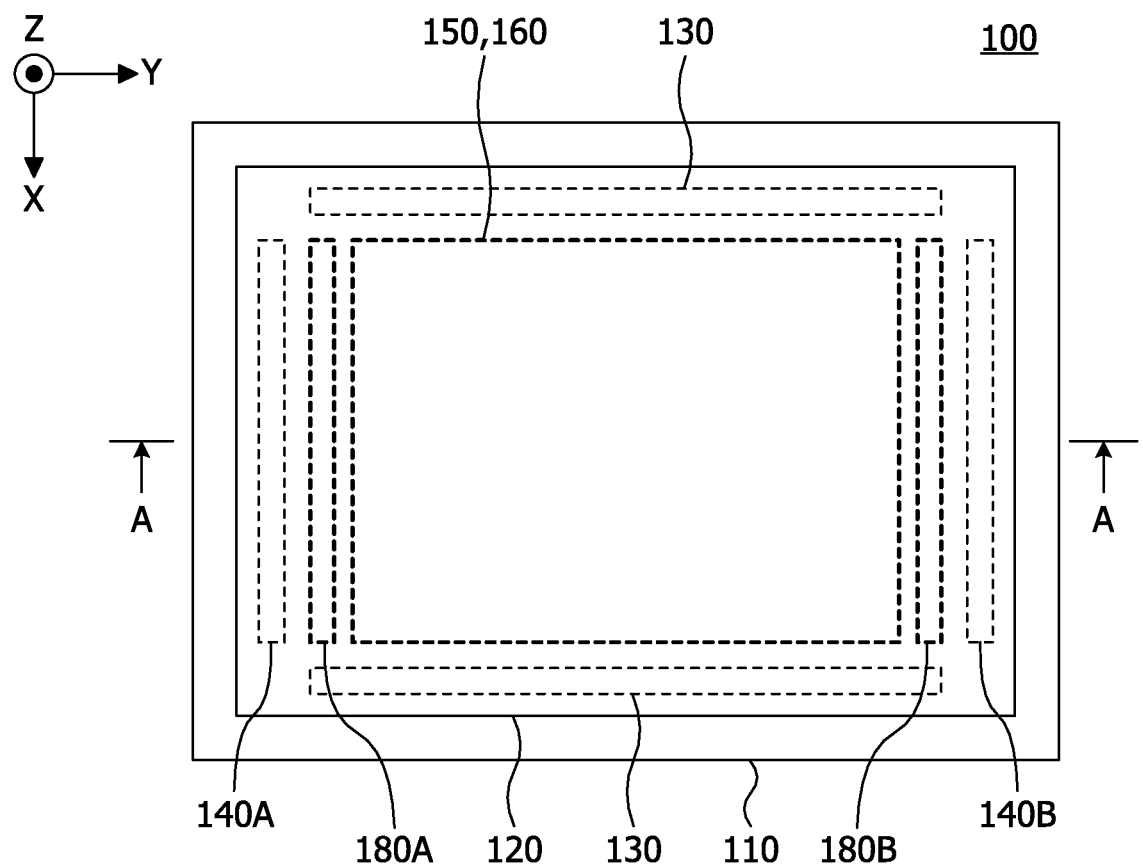
FIG. 2 is a plan view illustrating the electronic device according to the embodiment.
Figure 3:
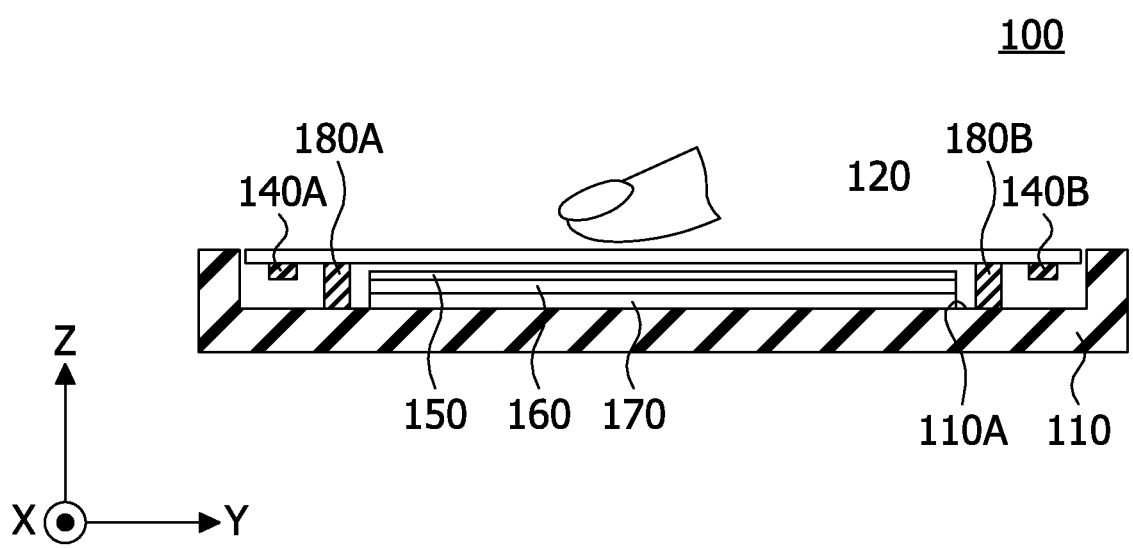
FIG. 3 is a view illustrating a sectional surface when viewed in an A-A arrow direction of the electronic device illustrated in FIG. 2.

FIG. 2 is a plan view illustrating the electronic device 100 according to the embodiment, and FIG. 3 is a view illustrating a sectional surface in an A-A arrow direction of the electronic device 100 illustrated in FIG. 2. In addition, in FIGS. 2 and 3, an XYZ coordinate system which is an orthogonal coordinate system is defined as illustrated in the drawings.

The electronic device 100 includes a housing 110, a top panel 120, a double-sided tape 130, vibrating elements 140A and 140B, a touch panel 150, a display panel 160, a board 170, and damping members 180A and 180B.

The housing 110 is made of, for example, a resin, includes the board 170, the display panel 160, the touch panel 150, and the damping members 180A and 180B disposed in a recess portion 110A, and includes the top panel 120 bonded to the housing 110 by the double-sided tape 130.

The top panel 120 is a thin flat plate-like member that is rectangular in a plan view, and is made of transparent glass or plastic, such as polycarbonate. A surface (a surface on a Z-axis positive direction side) of the top panel 120 is an example of an operation surface where the user of the electronic device 100 performs an operation input.

On the top panel 120, two vibrating elements 140A and 140B are bonded to a surface on a Z-axis negative direction side, and two sides in a plan view are bonded to the housing 110 by the double-sided tape 130. In addition, the top panel 120 is connected to the housing 110 by the two damping members 180A and 180B.

Further, the double-sided tape 130 may be capable of bonding the top panel 120 to the housing 110, and may have a rectangular ring shape which surrounds the touch panel 150 and the display panel 160 along the four sides of top panel 120.

The touch panel 150 is disposed on the Z-axis negative direction side of the top panel 120. The top panel 120 is provided to protect a surface of the touch panel 150. In addition, another panel, a protective film or the like may further be provided on the surface of the top panel 120.

The top panel 120 vibrates by driving the vibrating elements 140A and 140B in a state where the vibrating elements 140A and 140B are bonded to the surface on the Z-axis negative direction side. In the embodiment, the top panel 120 is vibrated at a natural vibration frequency of the top panel 120 to generate a standing wave on the top panel 120. However, since the vibrating elements 140A and 140B are bonded to the top panel 120, practically, it is preferable to determine the natural vibration frequency in consideration of the weight or the like of the vibrating elements 140A and 140B.

The vibrating elements 140A and 140B are bonded along the short side that extends in an X-axis direction on a Y-axis positive direction side and on a Y-axis negative direction side on the surface on the Z-axis negative direction side of the top panel 120. The two vibrating elements 140A and 140B may be disposed so as to be axial symmetrical with a center line parallel to the two short sides of the top panel 120 as a symmetrical axis. The vibrating elements 140A and 140B may be any element that is capable of generating vibration in an ultrasonic wave band, and for example, it is possible to use elements including the vibrating elements 140A and 140B, such as piezoelectric elements.

The vibrating elements 140A and 140B are driven by a driving signal output from a driving control unit which will be described later. An amplitude (intensity) and a frequency of the vibration generated by the vibrating elements 140A and 140B are set by the driving signal. In addition, ON and OFF of the vibrating elements 140A and 140B are controlled by the driving signal.

In a case of driving the two vibrating elements 140, in a case where a cycle number k is an integer, a symmetric mode is achieved, and thus, the two vibrating elements 140 may be driven at the same phase, and in a case where the cycle number k is a decimal (the number including an integer part and a decimal part 0.5), an asymmetrical mode is achieved, and thus, the two vibrating elements 140 may be driven at an opposite phase.

In addition, the ultrasonic wave band refers to, for example, a frequency band of approximately 20 kHz or more. In the electronic device 100 according to the embodiment, the frequency at which the vibrating elements 140A and 140B vibrate is equal to the frequency of the top panel 120, and thus, the vibrating elements 140A and 140B are driven by the driving signal to vibrate at the natural vibration frequency of the top panel 120.

The touch panel 150 is disposed above the display panel 160 (Z-axis positive direction side) and below the top panel 120 (Z-axis negative direction side). The touch panel 150 is an example of a coordinate detection unit that detects a position at which the user of the electronic device 100 touches the top panel 120 (hereinafter, referred to as the position of the operation input).

On the display panel 160 below the touch panel 150, various buttons and the like (hereinafter, referred to as GUI operation units) are displayed by the GUI. Therefore, the user of the electronic device 100 normally touches the top panel 120 with a fingertip to operate the GUI operation unit.

The touch panel 150 may be any coordinate detection unit that is capable of detecting the position of the operation input on the top panel 120 of the user, and may be, for example, an electrostatic capacity type or a resistive film type coordinate detection unit. Here, an aspect in which the touch panel 150 is the electrostatic capacity type coordinate detection unit will be described. Even when there is a gap between the touch panel 150 and the top panel 120, the electrostatic capacity type touch panel 150 is capable of detecting the operation input to the top panel 120.

Further, although an aspect in which the top panel 120 is disposed on an input surface side of the touch panel 150 will be described here, the top panel 120 may be integrated with the touch panel 150. In this case, the surface of the touch panel 150 becomes the surface of the top panel 120 illustrated in FIGS. 2 and 3 to construct the operation surface. Further, a configuration in which the top panel 120 illustrated to FIGS. 2 and 3 is omitted may be employed. Even in this case, the surface of the touch panel 150 constructs the operation surface. In this case, the member having the operation surface may be vibrated at the natural vibration of the member.

Further, in a case where the touch panel 150 is the resistive film type, the touch panel 150 may be disposed on the top panel 120. Even in this case, the surface of the touch panel 150 constructs the operation surface. Further, a configuration in which the top panel 120 illustrated to FIGS. 2 and 3 is omitted may be employed. Even in this case, the surface of the touch panel 150 constructs the operation surface. In this case, the member having the operation surface may be vibrated at the natural vibration of the member.

The display panel 160 may be, for example, a display unit that is capable of displaying an image of a liquid crystal substance display panel or an organic electroluminescence (EL) panel. The display panel 160 is installed on the top of the board 170 (on the Z-axis positive direction side) by a holder or the like (not illustrated) on the inside of the recess portion 110A of the housing 110.

The display panel 160 is driven and controlled by a driver integrated circuit (IC) which will be described later, and displays the GUI operation unit, the image, characters, symbols, figures, and the like in accordance with an operation situation of the electronic device 100.

The board 170 is disposed on the inside of the recess portion 110A of the housing 110. The display panel 160 and the touch panel 150 are disposed on the board 170. The display panel 160 and the touch panel 150 are fixed to the board 170 and the housing 110 by a holder or the like (not illustrated).

On the board 170, various circuits and the like which are inevitably used for driving the electronic device 100 are mounted in addition to a driving control device which will be described later.

The damping members 180A and 180B are provided to abut along the short side that extends in the X-axis direction on the Y-axis negative direction side and on the Y-axis positive direction side on the surface on the Z-axis negative direction side of the top panel 120. The damping members 180A and 180B are provided to suppress generation of noise in the audible range when generating the standing wave of the ultrasonic wave band on the top panel 120.

The damping members 180A and 180B are made of, for example, rubber, such as silicone rubber, natural rubber, or chloroprene rubber. The damping members 180A and 180B may be made of a deformable elastic body and/or a material having viscosity.

The damping members 180A and 180B are disposed such that an end portion (lower end) on the Z-axis negative direction side is bonded to the surface of the recess portion 110A of the housing 110, and an end portion (upper end) on the Z-axis positive direction side abuts against the surface on the Z-axis negative direction side of the top panel 120.

The positions of the two damping members 180A and 180B in the Y-axis direction are set as follows. The plurality of nodes and the plurality of antinodes of the standing wave generated on the top panel 120 are generated along the Y-axis direction.

A position of the damping member 180A in the Y-axis direction positioned on the Y-axis negative direction side is a position that corresponds to a second node from the end portion side on the Y-axis negative direction side of the top panel 120 among the plurality of nodes of the standing wave generated on the top panel 120.

In addition, a position of the damping member 180B in the Y-axis direction positioned on the Y-axis positive direction side is a position that corresponds to a second node from the end portion side on the Y-axis positive direction side of the top panel 120 among the plurality of nodes of the standing wave generated on the top panel 120. The reason why it is possible to suppress the generation of noise in the audible range by disposing the two damping members 180A and 180B at the positions will be described later.

In the electronic device 100 configured as described above, when the finger of the user touches the top panel 120 and the movement of the fingertip is detected, the driving control unit mounted on the board 170 drives the vibrating elements 140A and 140B to vibrate the top panel 120 at the frequency of the ultrasonic wave band. The frequency of the ultrasonic wave band is a resonance frequency of a resonant system including the top panel 120 and the vibrating elements 140A and 140B, and causes the top panel 120 to generate the standing wave.

The electronic device 100 provides the user with a sense of touch through the top panel 120 by generating the standing wave of the ultrasonic wave band. In addition, when generating the standing wave of the ultrasonic wave band on the top panel 120, the damping members 180A and 180B suppress generation of noise in the audible range.

Next, the standing wave generated on the top panel 120 will be described with reference to FIGS. 4A and 4B.

Figures 4A, 4B:
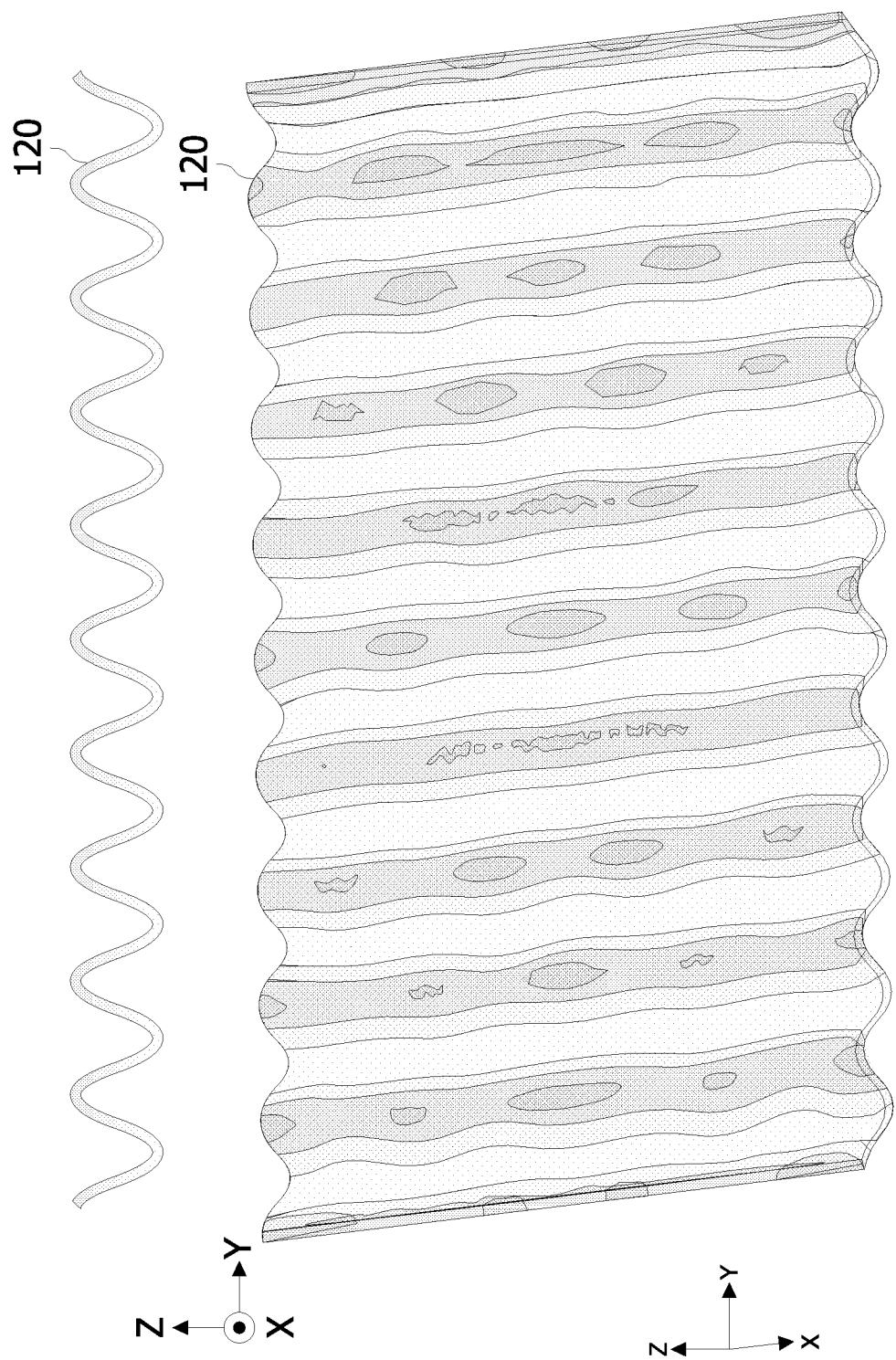
FIGS. 4A and 4B are views illustrating a wave crest formed in parallel to a short side of a top panel in a standing wave generated on the top panel by natural vibration of an ultrasonic wave band.

FIGS. 4A and 4B are views illustrating a wave crest formed in parallel to the short side of the top panel 120 in the standing wave generated on the top panel 120 by the natural vibration of the ultrasonic wave band, FIG. 4A is a side view, and FIG. 4B is a perspective view. In FIGS. 4A and 4B, XYZ coordinates similar to those of FIGS. 2 and 3 are defined. In addition, in FIGS. 4A and 4B, the displacement of the standing wave is exaggerated and illustrated in order to make it easy to understand. Further, in FIGS. 4A and 4B, the vibrating elements 140A and 140B will be omitted.

Using Young's modulus E, density ρ, Poisson's ratio δ, long side dimension l, thickness t of the top panel 120, and the cycle number k of the standing wave that exists in a long side direction, the natural vibration frequency (resonance frequency) f of the top panel 120 is expressed by the following equations (1) and (2). Since the standing wave has the same waveform in units of half a cycle, the cycle number k takes values with an interval of 0.5 and becomes 0.5, 1, 1.5, 2, and the like.

$$f = \frac{\pi k^2 t}{l^2} \sqrt{\frac{E}{3\rho(1-\delta^2)}} \tag{1}$$

$$f = ak^2 \tag{2}$$

In addition, a coefficient α of the equation (2) represents collectively coefficients other than $k^2$ in the equation (1).

The standing wave illustrated in FIGS. 4A and 4B is a waveform in a case where the cycle number k is 10 as an example. For example, in a case of using Gorilla (registered trademark) glass having a long side length L of 140 mm, a short side length of 80 mm, and a thickness t of 0.7 mm as the top panel 120, and in a case where the cycle number k is 10, the natural vibration frequency f is 33.5 kHz. In this case, the driving signal with a frequency of 33.5 kHz may be used.

Although the top panel 120 is a flat plate-like member, when the vibrating elements 140A and 140B (refer to FIGS. 2 and 3) are driven to generate the natural vibration of the ultrasonic wave band, by performing bending as illustrated in FIGS. 4A and 4B, the standing wave of bending vibration is generated.

Here, an aspect in which the two vibrating elements 140A and 140B are bonded along the short side that extends in the X-axis direction on the Y-axis positive direction side on the surface on the Z-axis negative direction side of the top panel 120 is described, but a configuration including any one of the vibrating elements 140A and 140B may be employed.

Figure 5A:
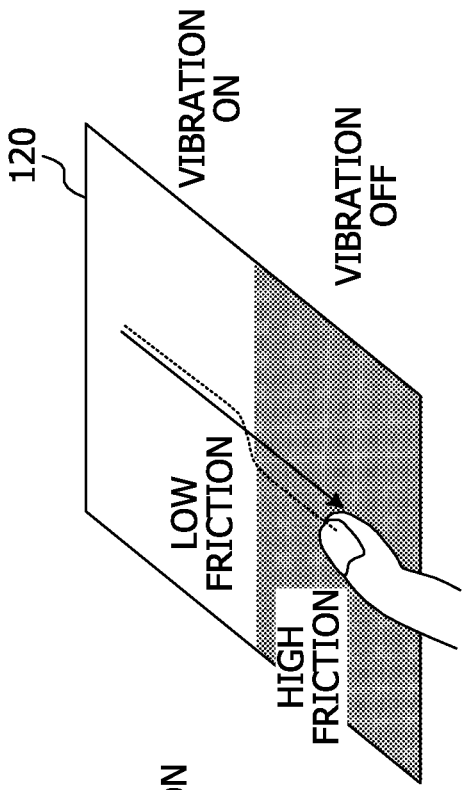
FIGS. 5A and 5B are views for describing how a dynamic friction force applied to a fingertip that performs an operation input changes due to the natural vibration of the ultrasonic wave band generated on the top panel of the electronic device.
Figure 5B:
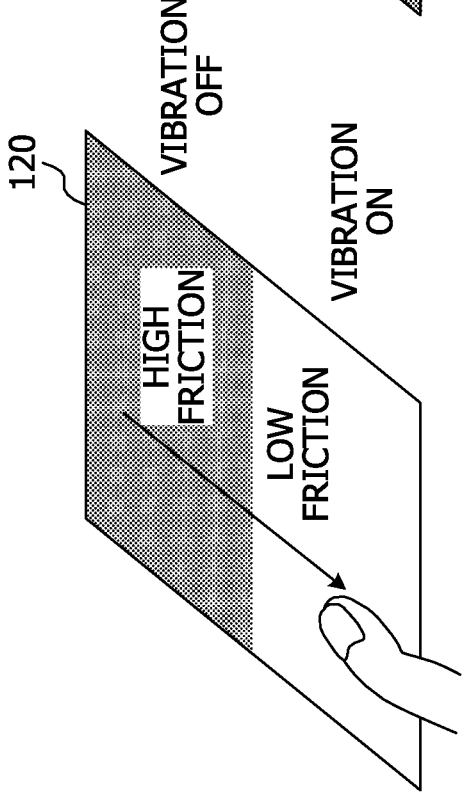

FIGS. 5A and 5B are views for describing how a dynamic friction force applied to a fingertip that performs the operation input changes due to the natural vibration of the ultrasonic wave band generated on the top panel 120 of the electronic device 100. In FIGS. 5A and 5B, while the user touches the top panel 120 with a fingertip, the operation input is performed to move the finger from a far side to a near side of the top panel 120 along the arrow. In addition, ON and OFF of the vibration is performed by turning on and off the vibrating element 140 (refer to FIGS. 2 and 3).

Further, in FIGS. 5A and 5B, in a depth direction of the top panel 120, a range touched by the finger while the vibration is off is illustrated in gray, and a range touched by the finger while the vibration is on is illustrated in white.

The natural vibration of the ultrasonic wave band occurs on the entire top panel 120 as illustrated in FIGS. 4A and 4B, but in FIGS. 5A and 5B, an operation pattern for switching the vibration on and off while the finger of the user moves from the far side to the near side of the top panel 120.

Therefore, in FIGS. 5A and 5B, in the depth direction of the top panel 120, the range touched by the finger while the vibration is off is illustrated in gray, and the range touched by the finger while the vibration is on is illustrated in white.

In the operation pattern illustrated in FIG. 5A, the vibration is off when the finger of the user is on the far side of the top panel 120, and the vibration is turned on while the finger is moved to the near side.

Meanwhile, in the operation pattern illustrated in FIG. 5B, the vibration is on when the finger of the user is on the far side of the top panel 120, and the vibration is turned off while the finger is moved to the near side.

Here, when the natural vibration of the ultrasonic wave band is generated on the top panel 120, an air layer caused by a squeeze effect is interposed between the surface of the top panel 120 and the finger, and a dynamic friction coefficient when the surface of the top panel 120 is traced with the finger decreases.

Therefore, in FIG. 5A, in the range illustrated in gray on the far side of the top panel 120, the dynamic friction force applied to the fingertip is large, and in the range illustrated in white on the near side of the top panel 120, the dynamic friction force applied to the fingertip becomes small.

Therefore, as illustrated in FIG. 5A, the user who performs the operation input to the top panel 120 senses the decrease in dynamic friction force applied to the fingertip when the vibration is turned on, and perceives the slipperiness of the fingertip. At this time, when the dynamic friction force decreases as the surface of the top panel 120 becomes slippery, the user feels that a recess portion exists on the surface of the top panel 120.

Meanwhile, in FIG. 5B, in the range illustrated in white on the far side of the top panel 120, the dynamic friction force applied to the fingertip is small, and in the range illustrated in gray on the near side of the top panel 120, the dynamic friction force applied to the fingertip becomes large.

Therefore, as illustrated in FIG. 5B, the user who performs the operation input to the top panel 120 senses the increase in dynamic friction force applied to the fingertip when the vibration is turned off, and perceives the difficulty of slipping of the fingertip or the sense of the applied force. In addition, when the dynamic friction force increases due to the fact that the fingertip is unlikely to slip, the user feels that a projection portion exists on the surface of the top panel 120.

As described above, in a case of FIGS. 5A and 5B, it is possible for the user to sense unevenness with a fingertip. The fact that a human perceives the unevenness in this manner is described, for example, in "printed material transfer method and sticky-band illusion for design of sense of touch (proceedings of the 11th SICE System Integration Division Conference (SI2010, Sendai) 174-177, 2010-12)". In addition, this is also described in "fishbone tactile illusion (proceedings of the 10th Annual Meeting of the Virtual Reality Society of Japan (September 2005))".

In addition, although the change in dynamic friction force in a case of switching the vibration on and off is described here, this is also the same as that in a case where the amplitude (intensity) of the vibrating element 140 is changed.

Next, the standing wave generated on the top panel 120 will be described with reference to FIG. 6.

Figure 6:
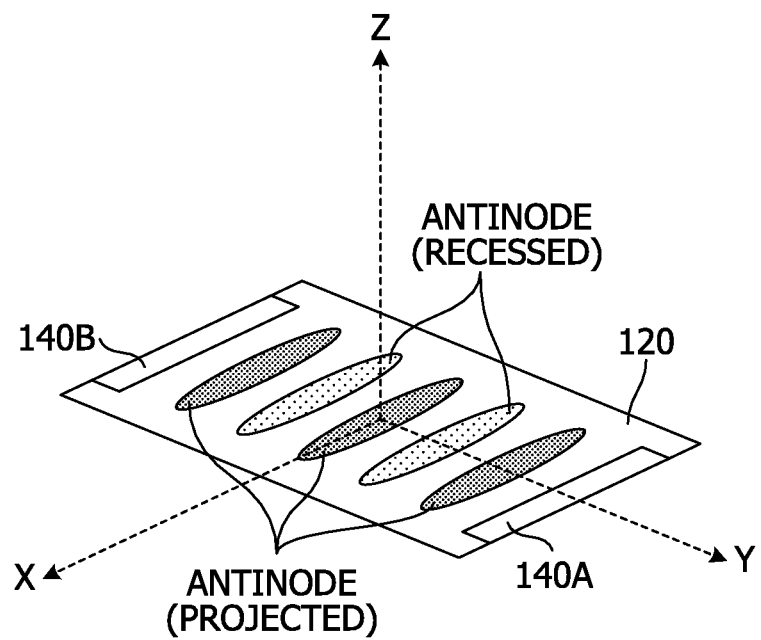
FIG. 6 is a view for describing the standing wave generated on the top panel.

FIG. 6 is a view for describing the standing wave generated on the top panel 120. In FIG. 6, XYZ coordinates similar to those of FIGS. 2 to 4B are defined.

The top panel 120 is provided with the vibrating elements 140A and 140B. Here, it is assumed that the vibrating elements 140A and 140B are driven in the same phase, and at a certain timing, the top panel 120 has a projected antinode illustrated in dark gray and a recessed antinode illustrated in light gray. The projected antinode illustrated in dark gray and the recessed antinode illustrated in light gray are generated at maximum amplitude.

In addition, at a timing different from the timing illustrated in FIG. 6 by a half cycle of the natural vibration of the standing wave, a recessed antinode of the maximum amplitude is generated at the projected antinode part illustrated in dark gray in FIG. 6, and a projected antinode at the maximum amplitude is generated at the recessed antinode part illustrated in light gray.

Next, a configuration of the electronic device 100 according to the embodiment will be described with reference to FIG. 7.

Figure 7:
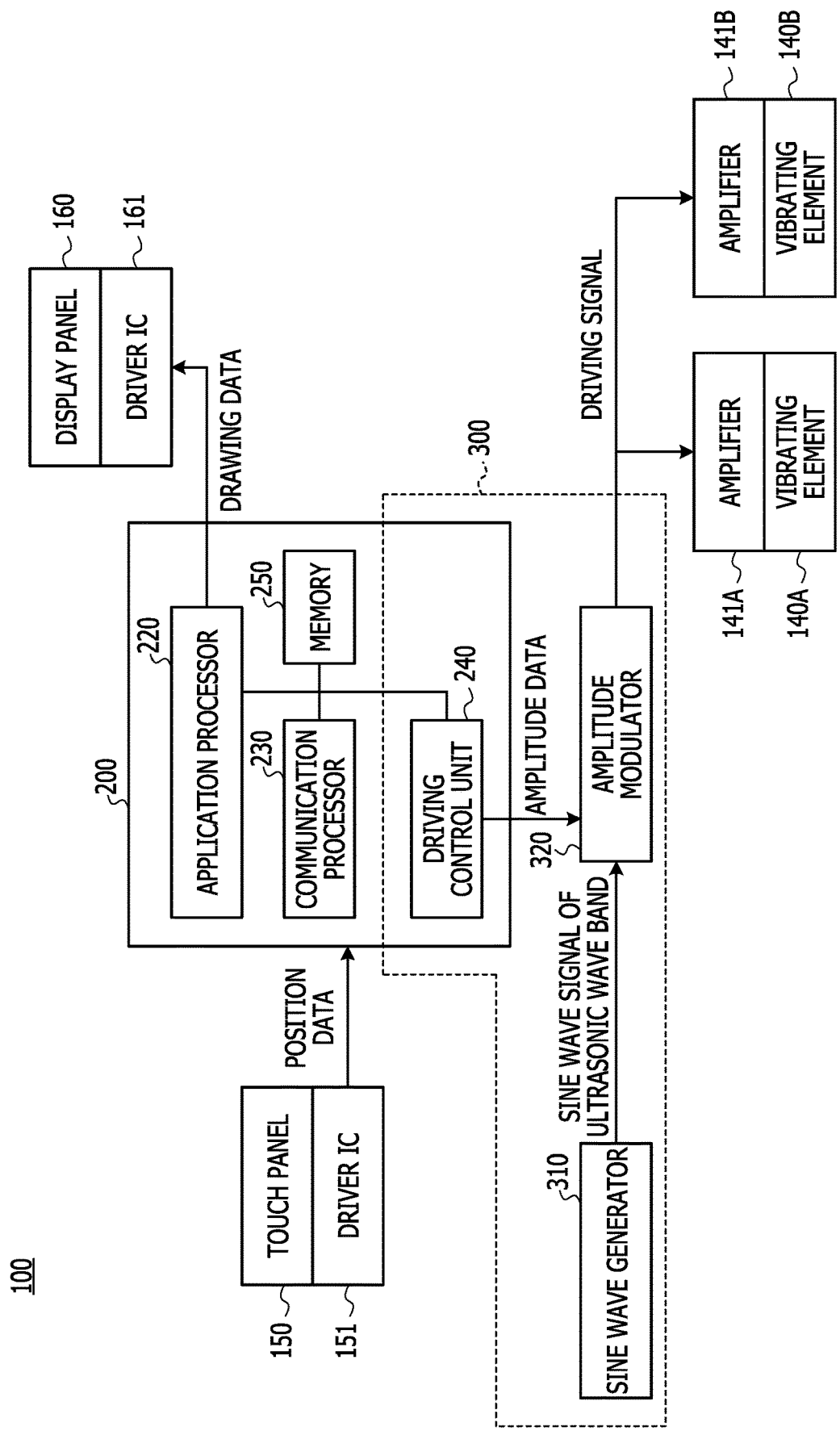
FIG. 7 is a view illustrating a configuration of the electronic device according to the embodiment.

FIG. 7 is a view illustrating the configuration of the electronic device 100 according to the embodiment.

The electronic device 100 includes the vibrating elements 140A and 140B, amplifiers 141A and 141B, the touch panel 150, a driver integrated circuit (IC) 151, the display panel 160, a driver IC 161, a control unit 200, a sine wave generator 310, and an amplitude modulator 320.

The control unit 200 includes an application processor 220, a communication processor 230, a driving control unit 240, and a memory 250. The control unit 200 is realized by, for example, an IC chip.

In addition, the driving control unit 240, the sine wave generator 310, and the amplitude modulator 320 construct a driving control device 300. In addition, although an aspect in which an application processor 220, a communication processor 230, a driving control unit 240, and a memory 250 are realized by one control unit 200 will be described here, the driving control unit 240 may be provided as another IC chip or processor on the outside of the control unit 200. In this case, among the data stored in the memory 250, data which is inevitably used for driving control of the driving control unit 240 may be stored in a memory different from the memory 250 and provided on the inside of the driving control device 300.

In FIG. 7, the housing 110, the top panel 120, the double-sided tape 130, and the board 170 (refer to FIG. 2) will be omitted. In addition, here, the amplifiers 141A and 141B, the driver IC 151, the driver IC 161, the driving control unit 240, the memory 250, the sine wave generator 310, and the amplitude modulator 320 will be described.

The amplifiers 141A and 141B are respectively disposed between the driving control device 300 and the vibrating elements 140A and 140B, and amplify the driving signals output from the driving control device 300 to drive the vibrating elements 140A and 140B.

The driver IC 151 is connected to the touch panel 150, detects position data that represents a position at which the operation input to the touch panel 150 is input, and outputs the position data to the control unit 200. As a result, the position data is input to the application processor 220 and the driving control unit 240. In addition, the inputting of the position data to the driving control unit 240 is equivalent to the inputting of the position data to the driving control device 300.

The driver IC 161 is connected to the display panel 160, inputs drawing data output from the driving control device 300 to the display panel 160, and causes the display panel 160 to display an image based on the drawing data. Accordingly, the GUI operation unit or the image based on the drawing data is displayed on the display panel 160.

The application processor 220 performs processing for executing various applications of the electronic device 100.

The communication processor 230 executes processing which is inevitably used for the electronic device 100 to perform communication, such as 3rd generation (3G), 4th generation (4G), long term evolution (LTE), Wi-Fi, and the like.

The driving control unit 240 outputs amplitude data to the amplitude modulator 320 in a case where two predetermined conditions are satisfied. The amplitude data is data that represents an amplitude value for adjusting the intensity of the driving signal used to drive the vibrating elements 140A and 140B. The amplitude value is set in accordance with a temporal change degree of the position data. Here, as the temporal change degree of the position data, the speed at which the fingertip of the user moves along the surface of the top panel 120 is used. The driving control unit 240 calculates a moving speed of the fingertip of the user based on the temporal change degree of the position data input from the driver IC 151.

Further, when the fingertip of the user moves along the surface of the top panel 120, the driving control device 300 according to the embodiment vibrates the top panel 120 in order to change the dynamic friction force applied to the fingertip. Since the dynamic friction force is generated when the fingertip is moving, the driving control unit 240 vibrates the vibrating elements 140A and 140B when the moving speed is equal to or higher than a predetermined threshold speed. A condition that the moving speed is equal to or higher than the predetermined threshold speed is a first predetermined condition.

Therefore, the amplitude value represented by the amplitude data output by the driving control unit 240 is zero when the moving speed is lower than the predetermined threshold speed, and is set to a predetermined amplitude value in accordance with the moving speed when the moving speed is equal to or higher than the predetermined threshold speed. When the moving speed is equal to or higher than the predetermined threshold speed, the amplitude value is set to be smaller as the moving speed is higher, and the amplitude value is set to be larger as the moving speed is lower.

In addition, the driving control device 300 according to the embodiment outputs the amplitude data to the amplitude modulator 320 in a case where the position of the fingertip that performs the operation input is in a predetermined region where the vibration is supposed to be generated. A condition that the position of the fingertip at which the operation input is performed is in the predetermined region where the vibration is supposed to be generated is a second predetermined condition.

It is determined whether or not the position of the fingertip that performs the operation input is in the predetermined region where the vibration is supposed to be generated, based on whether or not the position of the fingertip that performs the operation input is in the predetermined region where the vibration is supposed to be generated.

Here, the position on the display panel 160, such as the GUI operation unit displayed on the display panel 160, a region that displays an image, or a region that represents the entire page is specified by region data that represents the region. The region data is present in the region that displays all of the GUI operation units and the images displayed on the display panel 160 or the region that represents the entire page, in all applications.

Therefore, as the second predetermined condition, when it is determined whether or not the position of the fingertip that performs the operation input is in the predetermined region where the vibration is supposed to be generated, the type of application in which the electronic device 100 is activated matters. This is because the display of the display panel 160 differs depending on the type of the application.

In addition, this is because the type of the operation input for moving the fingertip that touched the surface of the top panel 120 differs depending on the type of the application. As the type of the operation input for moving the fingertip that touched the surface of the top panel 120, there is, for example, a so-called flick operation when operating the GUI operation unit. The flick operation is an operation of moving the fingertip along the surface of the top panel 120 by a relatively short distance so as to snap.

In addition, in a case of turning a page, for example, a swipe operation is performed. The swipe operation is an operation of moving the fingertip along the surface of the top panel 120 by a relatively long distance so as to sweep. The swipe operation is performed, for example, in a case of turning a photo, as well as in a case of turning a page. In addition, in a case of sliding a slider (refer to a slider 102B of FIG. 1) by the GUI operation unit, a drag operation which drags the slider is performed.

The operation input for moving the fingertip that touched the surface of the top panel 120, such as the flick operation, the swipe operation, and the drag operation, which are exemplified here, is used depending on the type of display by the application. Therefore, when it is determined whether or not the position of the fingertip that performs the operation input is in the predetermined region where the vibration is supposed to be generated, the type of application in which the electronic device 100 is activated matters.

The driving control unit 240 uses the region data to determine whether or not the position represented by the position data input from the driver IC 151 is in the predetermined region where the vibration is supposed to be generated.

The data that represents the type of the application, data in which the region data that represents the GUI operation unit or the like in which the operation input is performed, and pattern data that represents a vibration pattern are associated with each other, is stored in the memory 250.

In addition, the driving control unit 240 performs the following processing in order to interpolate a change in the position of the fingertip during a lead time from the time when the position data is input from the driver IC 151 to the driving control device 300 to the time when the driving signal is calculated based on the position data.

The driving control device 300 performs an arithmetic operation for each predetermined control cycle. The same also applies to the driving control unit 240. Therefore, assuming that the lead time from the time when the position data is input from the driver IC 151 to the driving control device 300 to the time when the driving control unit 240 calculates the driving signal based on the position data is Δt, the lead time Δt is equivalent to a control cycle.

Here, it is possible to obtain the moving speed of the fingertip as a speed of a vector that considers a point (x1, y1) represented by the position data input from the driver IC 151 to the driving control device 300 as a starting point, and a position of the fingertip after the lead time Δt has elapsed as an end point (x2, y2).

The driving control unit 240 estimates coordinates (x3, y3) after the lead time has elapsed by obtaining the vector considering a point (x2, y2) represented by the position data input from the driver IC 151 to the driving control device 300 as a starting point, and a position of the fingertip after the lead time Δt has elapsed as an end point (x3, y3).

In the electronic device 100 according to the embodiment, by estimating the coordinates after the lead time Δt has elapsed as described above, the change in position of the fingertip during the lead time Δt is interpolated.

Such an arithmetic operation for estimating the coordinates after the lead time Δt has elapsed is performed by the driving control unit 240. The driving control unit 240 determines whether or not the estimated coordinates are in the predetermined region where the vibration is supposed to be generated, and generates the vibration in a case where the estimated coordinates are in the predetermined region where the vibration is supposed to be generated. Accordingly, the second predetermined condition is a condition that the estimated coordinates are in the predetermined region where the vibration is supposed to be generated.

From the above, the two predetermined conditions which are inevitably used for the driving control unit 240 to output the amplitude data to the amplitude modulator 320 are conditions that the moving speed of the fingertip is equal to or higher than the predetermined threshold speed and the estimated coordinates are in the predetermined region where the vibration is supposed to be generated.

The driving control unit 240 reads the amplitude data that represents the amplitude value that corresponds to the moving speed from the memory 250 and outputs the amplitude data to the amplitude modulator 320 in a case where the moving speed of the fingertip is equal to or higher than the predetermined threshold speed and the estimated coordinates are in the predetermined region where the vibration is supposed to be generated.

The memory 250 stores association data of the data that represents the type of the application, the region data that represents the GUI operation unit or the like in which the operation input is performed, and the pattern data that represents the vibration pattern.

In addition, the memory 250 also stores data and programs that are inevitably used for the application processor 220 to execute the application, and data and programs that are inevitably used for the communication processor 230 to perform communication processing.

The sine wave generator 310 generates a sine wave which is inevitably used to generate a driving signal for generating the driving signal for vibrating the top panel 120 at the natural vibration frequency. For example, in a case where the top panel 120 is vibrated at a natural vibration frequency f of 33.5 kHz, the frequency of the sine wave is 33.5 kHz. The sine wave generator 310 inputs a sine wave signal of the ultrasonic wave band to the amplitude modulator 320.

The sine wave signal generated by the sine wave generator 310 is an AC reference signal which is the basis of the driving signal for generating the natural vibration of the ultrasonic wave band, and has a fixed frequency and a fixed phase. The sine wave generator 310 inputs a sine wave signal of the ultrasonic wave band to the amplitude modulator 320.

Here, although an aspect in which the sine wave generator 310 which generates the sine wave signal is used is described, the sine wave signal may not be generated. For example, a signal having a waveform obtained by blunting the rising and falling waveforms of a clock may be used. Therefore, a signal generator that generates an AC signal of the ultrasonic wave band may be used instead of the sine wave generator 310.

The amplitude modulator 320 modulates the amplitude of the sine wave signal input from the sine wave generator 310 using the amplitude data input from the driving control unit 240 to generate a driving signal. The amplitude modulator 320 modulates only the amplitude of the sine wave signal of the ultrasonic wave band input from the sine wave generator 310, and generates a driving signal without modulating the frequency and the phase.

Therefore, the driving signal output from the amplitude modulator 320 is a sine wave signal of the ultrasonic wave band obtained by modulating only the amplitude of the sine wave signal of the ultrasonic wave band input from the sine wave generator 310. In addition, in a case where the amplitude data is zero, the amplitude of the driving signal is zero. This is equivalent to a case where the amplitude modulator 320 does not output the driving signal.

Next, positions at which the damping members 180A and 180B are disposed will be described. The damping members 180A and 180B are disposed at positions that correspond to the second node from the end portion on the Y-axis negative direction side and on the Y-axis positive direction side of the top panel 120 among the plurality of nodes of the standing wave generated on the top panel 120.

In the device from which the damping members 180A and 180B are removed from the electronic device 100, it has been found that, when the sound in the audible range generated in a state where the fingertip of the user is in contact with the top panel 120 was measured with a microphone, a large amount of frequency components of one half or one quarter of the frequency (driving frequency) of the driving signal applied to the vibrating elements 140A and 140B from the driving control unit 240 are output. Assuming that the driving frequency is fc and the integer of 2 or more is N, the sound with the fractional frequency of fc/N is generated and considered to be audible. The sound that may be heard by humans in this manner are the sound in the audible range, and may be noise in some cases.

Assuming that the vibration of a frequency fc/2 is applied to the top panel 120 when vibration of driving frequency fc is generated on top panel 120 and the fingertip and top panel 120 collide with each other fc times per second, the fingertip and the top panel 120 collide with each other fc/2 times in a sense of one second as the vibration of the frequency fc and the frequency fc/2 are combined with each other. The frequency fc/2 is a frequency in the audible range.

Accordingly, it is considered that the top panel 120 is excited by the force component of the frequency fc/2, the vibration of the frequency fc/2 becomes large, and the sound in the audible range is measured by the microphone. Similarly, it is considered that there is a possibility of generation of the vibration of the frequency of fc/N when N is all integers of 2 or more.

When estimating sound for top panels 120 having various dimensions and Young's modulus, the components which are often actually measured are the components of the frequencies fc/2, fc/3, and fc/4. Therefore, it is considered that the sound in the audible range may be reduced by reducing the vibration at these frequencies. In the bending vibration that causes the top panel 120 to generate the standing wave, a relationship between the frequency f and the wavelength P is expressed by the following equation (3). In other words, the wavelength P is inversely proportional to the square root of the frequency f.

$$P \propto 1/\sqrt{f} \quad (3)$$

Here, assuming that the standing wave of the frequency fc driven by the driving control unit 240 is referred to as a fundamental standing wave, the wavelength of the bending vibration of the frequency of fc/2 with respect to the wavelength of the fundamental standing wave is $\sqrt{2}$ times the wavelength P of the fundamental standing wave. In addition, the wavelength of the bending vibration at the frequency fc/3 is $\sqrt{3}$ times the wavelength P of the fundamental standing wave, and the wavelength of the bending vibration at the frequency fc/4 is two times the wavelength P of the fundamental standing wave.

Figure 8:
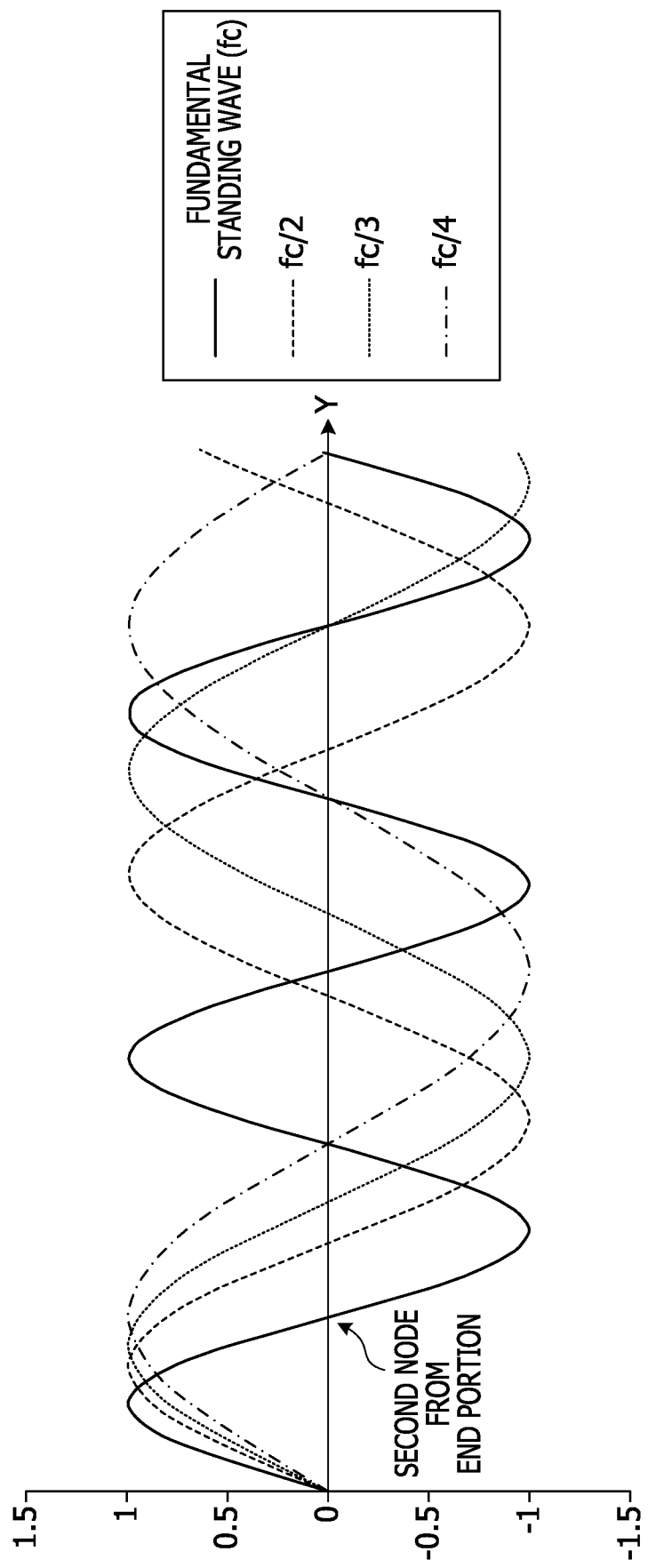
FIG. 8 is a view illustrating a waveform of a fundamental standing wave and a standing wave of a fractional frequency in a case where both ends of the top panel are support ends.

Under the condition that displacement at the end in the Y-axis direction of the top panel 120 is zero and there is a gradient due to the bending vibration (condition that the end of the top panel 120 in the Y-axis direction is a support end), the standing waves of a wavelength $\sqrt{2}$P (frequency fc/2), a wavelength $\sqrt{3}$P (frequency fc/3), and a wavelength 2P (frequency fc/4) are as illustrated in FIG. 8. Under such boundary conditions, since the shape of the standing wave is a trigonometric function from the theory of vibration of a beam, here, the shape of the standing wave is represented by the trigonometric function obtained by magnifying the wavelength P $\sqrt{2}$ times, $\sqrt{3}$ times, and two times.

FIG. 8 illustrates a view illustrating waveforms of the fundamental standing wave of wavelength P (frequency fc), the standing wave of wavelength $\sqrt{2}$P (frequency fc/2), the standing wave of wavelength $\sqrt{3}$P (frequency fc/3), and the standing wave of wavelength 2P (frequency fc/4) in a case where both ends of the top panel 120 are support ends. FIG. 8 illustrates only the end portion side on the Y-axis negative direction side of the top panel 120.

Figure 9:
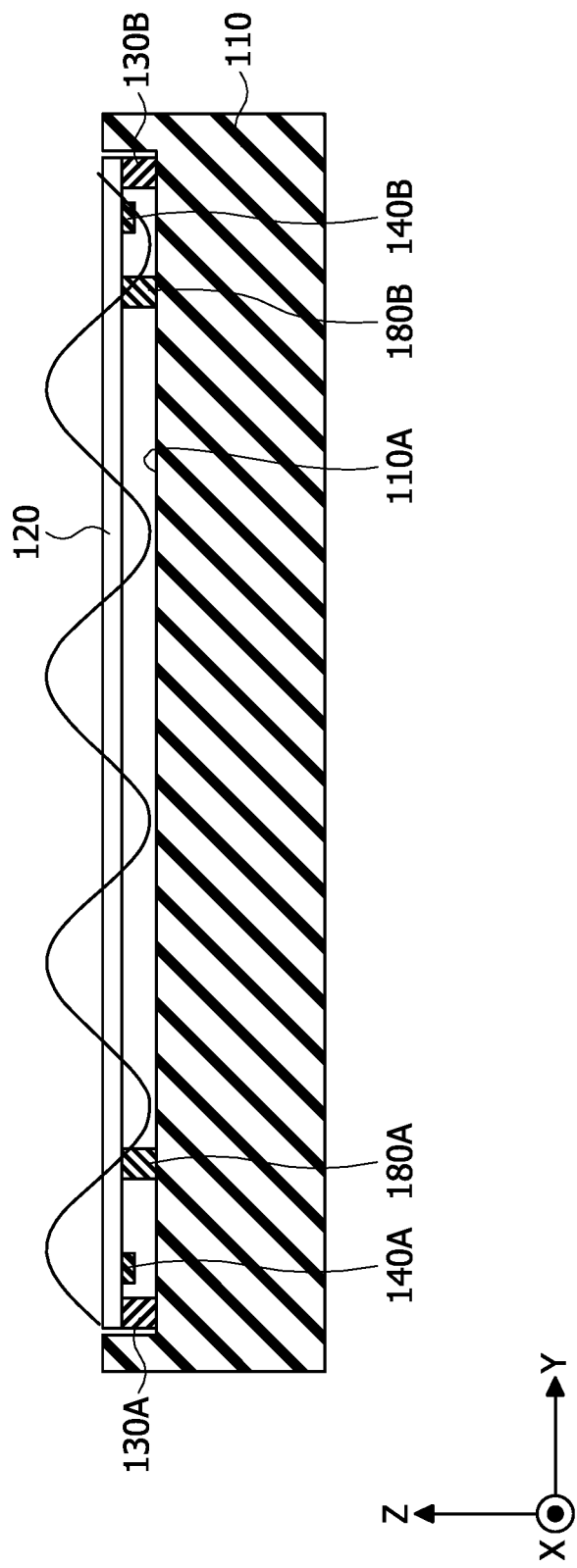
FIG. 9 is a view illustrating a relationship between the waveform of the fundamental standing wave generated on the top panel and the position of a damping member in a case where both ends of the top panel are the support ends.

In addition, FIG. 9 is a view illustrating a relationship between the waveform of the fundamental standing wave generated on the top panel 120 and the positions of the damping members 180A and 180B in a case where both ends of the top panel 120 are the support ends.

In FIG. 8, the horizontal axis is Y-axis, and Y=0 represents the end portion on the Y-axis negative direction side of the top panel 120. In addition, the vertical axis represents the displacement of the standing wave (displacement in the Z-axis direction). A case where the value in the vertical axis is zero (0) indicates that the top panel 120 is not displaced in the Z-axis direction. Therefore, the point at which the value in the vertical axis is zero (0) is the node of the standing wave. In addition, the point at which the value in the longitudinal axis is at the positive or negative maximum is the antinode of the standing wave. Further, the waveforms of the four standing waves illustrated in FIG. 8 are at the moment when the displacement at the antinodes is maximized.

The positions of the nodes of the fundamental standing wave and the positions of the nodes of the standing waves of the frequencies fc/2, fc/3, and fc/4 do not match each other because the wavelengths are different from each other. However, when the node at the end (Y=0 position) of the fundamental standing wave is the first node, for example, in the second node from the Y-axis negative direction side of the fundamental standing wave, the displacement of the standing wave of the frequency fc/2 is approximately 70% of the maximum value, the displacement of the standing wave of the frequency fc/3 is approximately 85% of the maximum value, and the displacement of the standing wave of the frequency fc/4 is the maximum value.

Here, as illustrated in FIG. 9, when the damping members 180A and 180B are disposed between the top panel 120 and the housing 110 at the position of the second node from the end of the fundamental standing wave, the driving efficiency of the fundamental standing wave does not receive influence too much, and it is considered that the vibration of the frequencies fc/2, fc/3, and fc/4 may be attenuated.

Due to the deformation of the damping members 180A and 180B, energy loss is generated to the vibration of the frequencies fc/2, fc/3, and fc/4, and the vibration is attenuated. However, in a case of the fundamental standing wave, the vibration is not obstructed because the top panel 120 is not displaced at the node. It is considered that the vibration is likely to be attenuated as the standing wave is in a mode in which the positions of the damping members 180A and 180B are closer to the antinode.

Therefore, disposition of the damping members 180A and 180B at the position of the second node from the end of the fundamental standing wave is effective in reducing the vibration of the fractional frequencies fc/2, fc/3, and fc/4, and suppressing generation of the sound in the audible range.

From the above-described reasons, the damping members 180A and 180B are respectively disposed at positions that correspond to the second node from the end portion side on the Y-axis negative direction side and on the Y-axis positive direction side of the top panel 120 among the plurality of nodes of the standing wave generated on the top panel 120.

In addition, a position that corresponds to a node is not limited to the exact position at which the node is present in the direction (Y-axis direction) in which the node and the antinode of the standing wave are arranged, and means a position including a predetermined range before and after (front and rear sides in the Y-axis direction) of the node in a direction (Y-direction) in which the node and the antinode of the standing wave are arranged. In other words, a position that corresponds to a node means a position including the vicinity of the node in addition to the exact position at which the node exists. The vicinity of the node is, for example, a range of ±WL/10 with respect to a wavelength WL of the standing wave.

Figure 10:
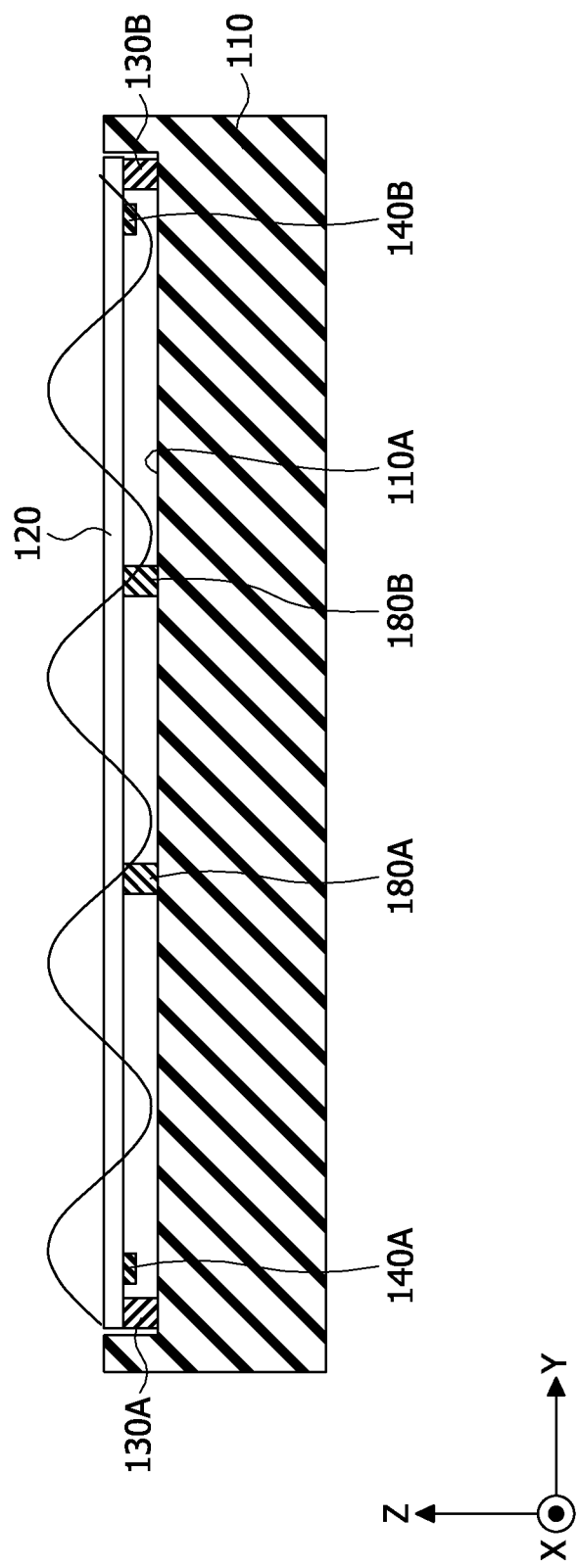
FIG. 10 is a view illustrating a relationship between the waveform of the fundamental standing wave generated on the top panel and the position of the damping member.

FIG. 10 is a view illustrating a relationship between the waveform of the fundamental standing wave generated on the top panel 120 and the position of the damping members 180A and 180B. Compared to FIG. 9, in FIG. 10, the damping members 180A and 180B are present at the position of the fourth node from the end of the fundamental standing wave.

In FIG. 8, at the fourth node from the end of the fundamental standing wave, the displacement of the standing wave of the frequency fc/2 is approximately 20% of the maximum value, the displacement of the standing wave of the frequency fc/3 is approximately 70% of the maximum value, and the displacement of the standing wave of the frequency fc/4 is the maximum value.

Therefore, as illustrated in FIG. 10, when the damping members 180A and 180B are disposed at the position of the fourth node from the end of the fundamental standing wave, it is considered that the vibration of the fractional frequencies fc/2, fc/3, and fc/4 may be reduced and the sound in the audible range may be suppressed although the effect is not as much as that of the second node from the end of the fundamental standing wave.

In addition, not being limited to the second and fourth nodes from the end of the fundamental standing wave, as long as the damping members 180A and 180B are disposed at the positions after the third or fifth node from the end of the fundamental standing wave, it is considered that the similar effects may be obtained.

Next, a case where both ends of the top panel 120 are free ends will be described. A case where both ends of the top panel 120 are free ends and the standing waves of the wavelength √2P (frequency fc/2), the wavelength √3P (frequency fc/3), and the wavelength 2P (frequency fc/4), are illustrated in FIG. 11.

Figure 11:
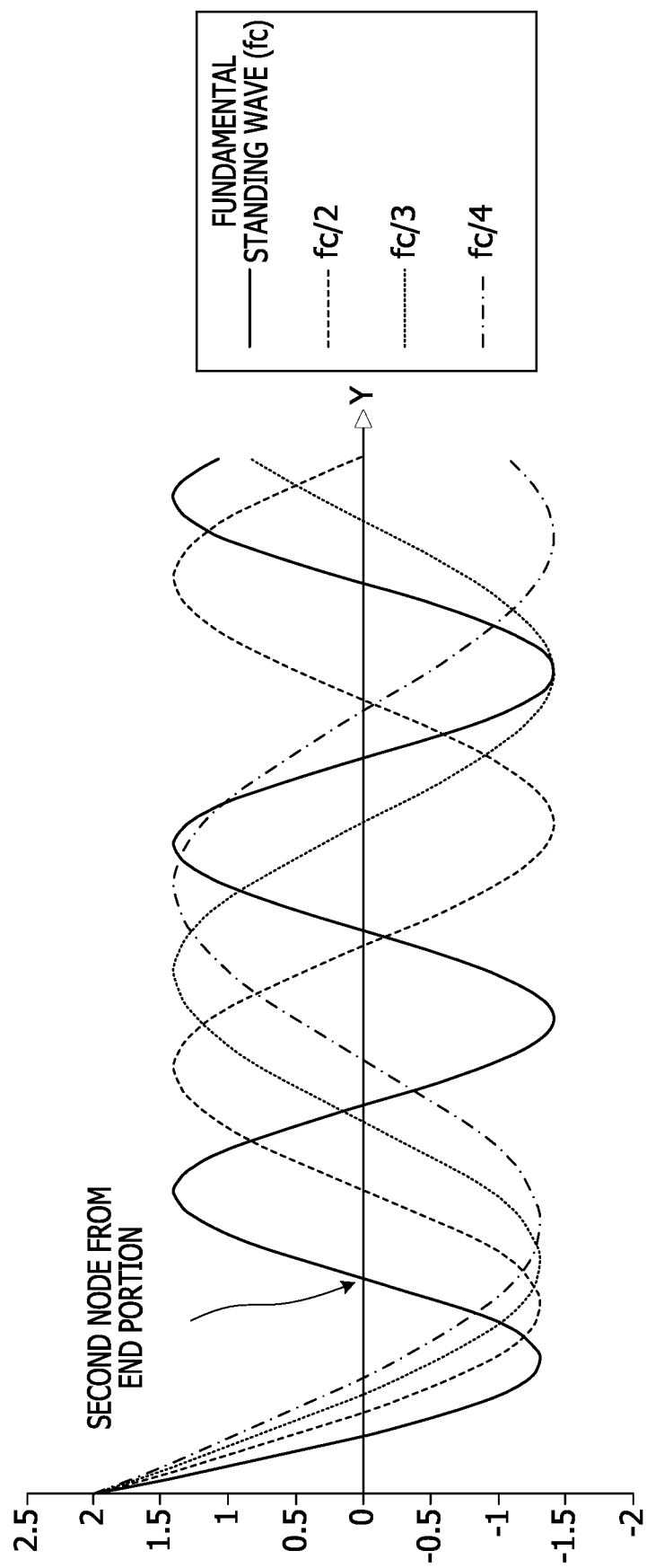
FIG. 11 is a view illustrating a waveform of the fundamental standing wave and the standing wave of the fractional frequency in a case where both ends of the top panel are free ends.

FIG. 11 illustrates a view illustrating waveforms of the fundamental standing wave of the wavelength P (frequency fc), the standing wave of the wavelength √2P (frequency fc/2), the standing wave of the wavelength √3P (frequency fc/3), and the standing wave of the wavelength 2P (frequency fc/4) in a case where both ends of the top panel 120 are free ends. FIG. 11 illustrates only the end portion side on the Y-axis negative direction side of the top panel 120. The end portion of the fundamental standing wave in a case where the end portion of the top panel 120 is not a node and becomes an antinode.

Figure 12:
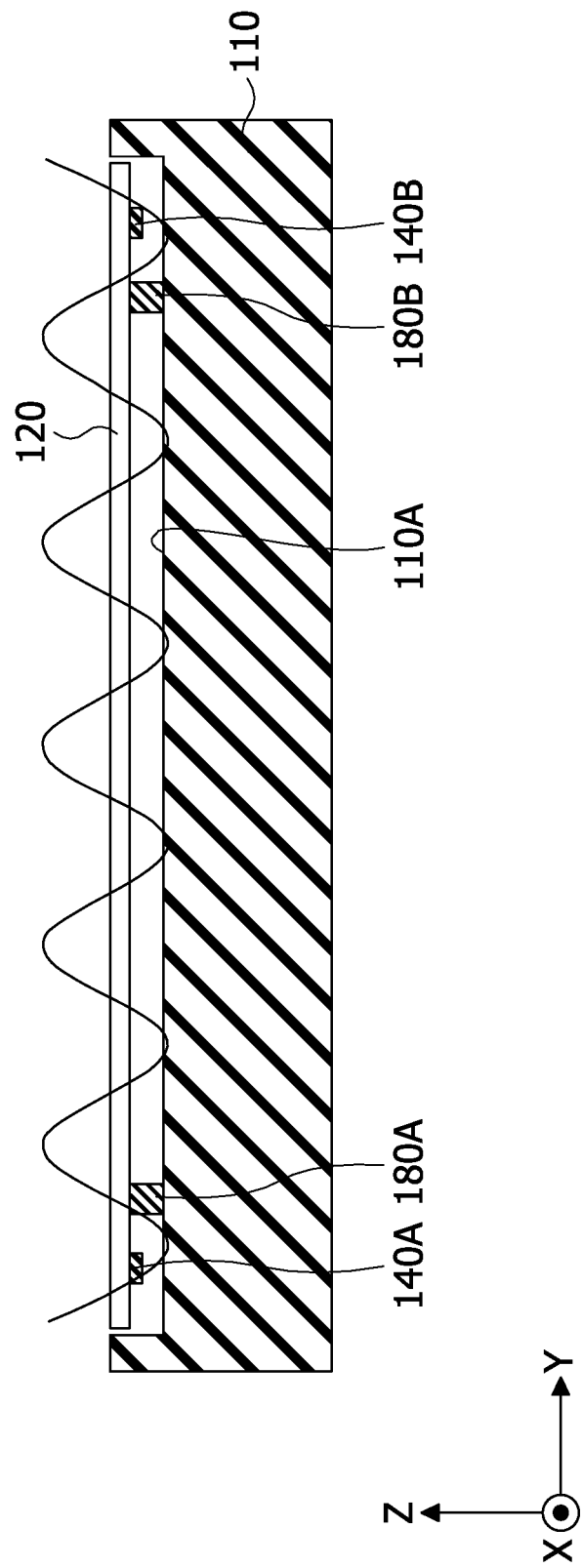
FIG. 12 is a view illustrating a relationship between the waveform of the fundamental standing wave and the position of the damping member in a case where both ends of the top panel are the free ends.

In addition, FIG. 12 is a view illustrating a relationship between the waveform of the fundamental standing wave generated on the top panel 120 and the positions of the damping members 180A and 180B in a case where both ends of the top panel 120 are the free ends.

In FIG. 11, the horizontal axis is Y-axis, and Y=0 represents the end portion on the Y-axis negative direction side of the top panel 120. In addition, the vertical axis represents the displacement of the standing wave (displacement in the Z-axis direction).

The waveforms of the fundamental standing wave of the wavelength P (frequency fc) illustrated in FIG. 11, the standing wave of the wavelength √2P (frequency fc/2), the standing wave of the wavelength √3P (frequency fc/3), and the standing wave of the wavelength 2P (frequency fc/4) are obtained from the fact that all of the standing waves are expressed in the following equation (4) by the sum of a trigonometric function and a hyperbolic function from the theory of the bending vibration of the beam.

$$U(Y)=C_1 \cosh(\lambda Y/L)+C_2 \sinh(\lambda Y/L)+C_3 \cos(\lambda Y/L)+C_4 \sin(\lambda Y/L) \quad (4)$$

In the equation (4), Y is a Y coordinate, U(Y) is displacement of the standing wave in Z-axis direction, L is a length of the top panel 120 in Y-axis direction, $\lambda/L$ is a wave number of the wave in Y-axis direction, $\lambda$ is an eigenvalue determined from the boundary conditions, and $C_1$, $C_2$, $C_3$, and $C_4$ are coefficients.

Using the boundary condition of the free end, it is possible to determine the eigenvalue $\lambda$ and the coefficients $C_1$, $C_2$, $C_3$, and $C_4$ of each term. The frequency and the wavelength of the standing wave are determined by the eigenvalue $\lambda$, but since the eigenvalue is a discrete value, there is almost no standing wave of exactly ½ of the frequency. In FIG. 11, a standing wave mode close to a frequency of ½ of the frequency fc, a standing wave mode close to a frequency of ⅓ of the frequency fc, and a standing wave mode close to a frequency of ¼ of the frequency fc, are illustrated.

From FIG. 11, among the plurality of nodes of the fundamental standing wave, at the position of the second node when viewed from the end portion on the Y-axis negative direction side of the top panel 120, the other three standing waves are close to the antinode, and thus, when the damping member 180A is disposed at the position, it is found that it is possible to effectively attenuate waves other than the fundamental standing wave. In addition, the damping member 180B may be disposed at the position of the second node from the end portion on the Y-axis positive direction side of the top panel 120 from the same idea.

In other words, as illustrated in FIG. 12, even in a case where the condition of the end portion of the top panel 120 is the free end, it is saying that disposition of the damping members 180A and 180B at the position of the second node from the end portion in the Y-axis negative direction and in Y-axis positive direction of the top panel 120, is effective to attenuate the sound in the audible range.

In addition, in FIG. 11, even at the positions after the third, fourth, or fifth node from the end of the fundamental standing wave, the displacement occurs in the standing wave of the frequencies fc/2, fc/3, and fc/4 although the displacement is not as much as that of the second node from the end of the fundamental standing wave. This is the same as a case where the end portion condition of the top panel 120 is the support end.

Therefore, even when the damping members 180A and 180B are disposed at the position after the third, fourth, or fifth node from the end of the fundamental standing wave, it is considered that the vibration of the fractional frequencies fc/2, fc/3, and fc/4 may be reduced and the generation of the sound in the audible range may be suppressed although the effect is not as much as that of the second node from the end of the fundamental standing wave.

Above, as illustrated in FIGS. 9 to 12, even when the end portion of the to the top panel 120 is any of the support end and the free end, the vibration of the fractional frequencies fc/2, fc/3, and fc/4 may be reduced and the generation of the sound in the audible range may be suppressed as long as the damping members 180A and 180B are disposed at the position after the second node from the end of the fundamental standing wave.

In addition, the condition that the displacement of the standing wave in the end portion of the top panel 120 is zero and the gradient is also zero may be considered. In this case, since it is found that the position of the node other than the first end of the standing wave is the same as the position in a case of the free end from the theory of the bending vibration of the equation (4), it is saying that the second node is effective similar to the case of the free end.

When the length L, the thickness t, and the material of the top panel 120 in the Y-axis direction are determined, the frequency fc of the fundamental standing wave will be determined accordingly. The relationship between the frequency fc of the bending vibration and the eigenvalue λ of the equation (4) becomes the following equation (5) using the length L, the thickness t, the density ρ, and the Young's modulus E. The density ρ and the Young's modulus E are determined depending on the material.

$$f = \frac{\lambda^2 t}{2\pi L^2}\sqrt{\frac{E}{12\rho}} \quad (5)$$

The eigenvalue λ takes a value given by $\lambda_m = m\pi$ (m is an integer of 1 or more) under the condition that the end portion of the top panel 120 is a support end. In a case where the end portion of the top panel 120 is a free end, when the solution of cos λ cosh λ=1 is an eigenvalue and the solution is obtained by numerical calculation, $\lambda_1$=4.73, $\lambda_2$=7.85, $\lambda_3$=10.996, and the like are obtained, and approximation is possible by an approximation of $\lambda_m$=(m+0.5)π with considerably high accuracy.

Since the eigenvalue λ is a discrete value, the resonance frequency to be a standing wave is also discrete accordingly, and any of the standing wave of the fundamental frequency fc and the standing wave of the fractional frequencies fc/2, fc/3, and fc/4 is in a mode of the standing waves in which the number of waves included in the length L of the top panel 120 is different.

When one of the resonance frequencies is chosen as the frequency used to provide the sense of touch, the eigenvalue λ, that is, the mode of the standing wave, is determined and the position of the node may also be calculated. According to a structure of calculating the position of the second node from the end and disposing the damping members 180A and 180B at the position, it is possible to suppress the generation of the sound in the audible range as described above.

Practically, even when the standing wave mode is specified, individual differences among the top panel 120 and/or the vibrating elements 140A and 140B cause dispersion in the resonance frequency, but the dispersion is smaller than the frequency interval of the discrete resonance frequencies, and thus, when corresponding to the dispersion of the resonance frequency in the fine adjustment of the driving frequency, the same standing wave mode is used all the time and the position of the node does not change. Therefore, the influence of the individual differences, such as the top panel 120 and/or the vibrating elements 140A and 140B, does not occur at the optimum position of the damping members 180A and 180B.

In a case where the end portion of the top panel 120 is the support end, the eigenvalue λ is represented by λ=mπ, and when the coefficients $C_1$, $C_2$, $C_3$, and $C_4$ of each term of the equation (4) is obtained from the boundary conditions, the displacement of the standing wave mode represented by the following equation (6) is obtained.

$$U(Y) = \sin(m\pi Y/L)(0 \le Y \le L) \quad (6)$$

The equation (6) is a trigonometric function that represents the displacement U(Y) in a case where the end portion of the top panel 120 is a node, and the position of the second node from the equation (6) is simply obtained by the following equation (7).

$$Y = L/m \quad (7)$$

In a case where the end portion of the top panel 120 is a free end, the eigenvalue λ is λ=(m+0.5) π, and the displacement U(Y) of the standing wave may be approximately calculated by the following equation (8).

$$U(Y) = \cosh(\lambda Y/L) - \sinh(\lambda Y/L) + \cos(\lambda Y/L) - \sin(\lambda Y/L)$$
$$(0 \le L \le L) \quad (8)$$

Since the contribution of the hyperbolic function is small except for the part further near the end than the second node from the end, when combining only the terms of the trigonometric function into one, the following expression (9) may be obtained.

$$U(Y) = \sqrt{2} \cos(\lambda Y/L + \pi/4) \quad (9)$$

For example, since the second node from the end corresponds to a position of 3π/2 of the phase of the standing wave, a relationship of the following equation (10) may be obtained from the equation (9).

$$\lambda Y/L + \pi/4 = 3\pi/2 \quad (10)$$

From the above, the position of the second node in the case of the free end may be obtained by the following equation (11).

$$Y = (5/4)\pi L/\lambda = (5/4)L/(m+0.5) \quad (11)$$

When the value of m that represents the standing wave mode is determined in this manner, the position of the node may be calculated. As described above, although the value of m may be determined from the resonance frequency almost certainly, when checking more carefully, the vibration distribution is measured using a laser Doppler vibrometer and the like, and it is found which standing wave mode is when examining the number of nodes and antinodes of the vibration intensity.

The shape of the standing wave mode or the position of the nodes described so far uses the theory of the bending vibration of the beam and corresponds to a case where the top panel 120 is employed as a single body. Practically, pasting the vibrating elements 140A and 140B slightly affects the mode shape. In particular, in a case where the vibrating elements 140A and 140B are thick with respect to the top panel 120, the influence increases, and thus, the position of the node may be determined by the above-described equation (7) or (11), but by performing simulation of finite element analysis, it is possible to obtain more accurate position of the node.

Here, by disposing the damping members 180A and 180B at the positions of the nodes of the fundamental standing wave, in order to confirm that it is possible to attenuate the standing wave of the fractional frequency without attenuating the fundamental standing wave, simulation of finite element analysis was performed.

Figure 13:
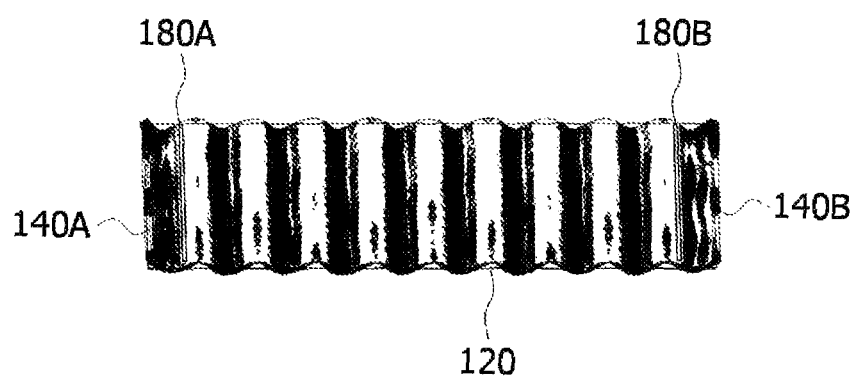
FIG. 13 is a view illustrating an analysis result of vibration of a touch panel in a case where the vibrating element is driven.

FIG. 13 is a view illustrating an analysis result of the vibration of the top panel 120 in a case where the vibrating elements 140A and 140B are driven. In FIG. 13, the position at which the damping members 180A and 180B are disposed is the position of the second node from the end portion on the Y-axis negative direction side and on the Y-axis positive direction side of the fundamental standing wave of the top panel 120.

Figure 14:
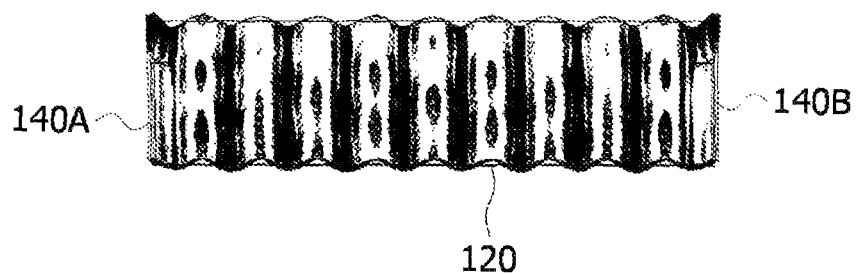
FIG. 14 is a view for comparison illustrating an analysis result of the vibration of the touch panel in a case where the vibrating element is driven under a condition that the damping member is absent.

For comparison, FIG. 14 is a view illustrating an analysis result of the vibration of the top panel 120 in a case where the vibrating elements 140A and 140B are driven under the condition that the damping members 180A and 180B are absent.

Here, the vibration frequency of the simulation conditions for obtaining the analysis results of FIGS. 13 and 14 is the resonance frequency fc of the fundamental standing wave. As is found by comparing FIGS. 13 and 14, the amplitude of the standing wave hardly changes depending on whether or not the damping members 180A and 180B were at the position of the second node from the end portion. Accordingly, it has been found that, even when the damping members 180A and 180B were attached to the top panel 120, the amplitude of the fundamental standing wave was hardly attenuated.

Figure 15:
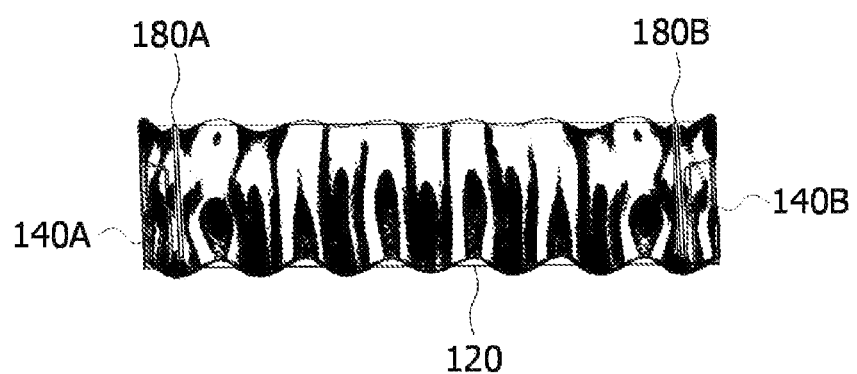
FIG. 15 is a view illustrating an analysis result of the vibration of the touch panel in a case where the vibrating element is driven.

FIG. 15 is a view illustrating an analysis result of the vibration of the top panel 120 in a case where the vibrating elements 140A and 140B are driven. In FIG. 15, the positions at which the damping members 180A and 180B are disposed are the same as those in FIG. 13.

Figure 16:
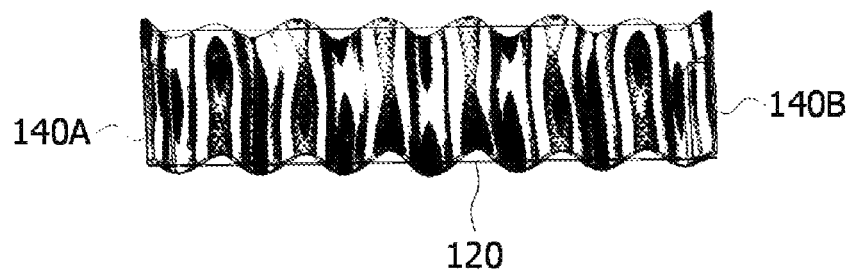
FIG. 16 is a view for comparison illustrating an analysis result of the vibration of the touch panel in a case where the vibrating element is driven under a condition that the damping member is absent.

For comparison, FIG. 16 is a view illustrating an analysis result of the vibration of the top panel 120 in a case where the vibrating elements 140A and 140B are driven under the condition that the damping members 180A and 180B are absent.

Here, the resonance frequency of the simulation condition for obtaining the analysis results of FIGS. 15 and 16 is approximately ½ of the resonance frequency fc of the fundamental standing wave.

Compared to FIG. 16, the amplitude is attenuated to approximately ⅐ in FIG. 15. In this manner, by disposing the damping members 180A and 180B at the position of the second node from the end portion on the Y-axis negative direction side and on the Y-axis positive direction side of the fundamental standing wave of the top panel 120, it has been found that the amplitude of the standing wave of the frequency of approximately ½ of the resonance frequency fc is significantly attenuated.

Here, since the simulations of FIGS. 15 and 16 drive the vibrating elements 140A and 140B at a frequency of approximately ½ of the resonance frequency fc, the situation is different from the causes of the vibration of the fractional frequency fc/2 in the actual electronic device 100.

Practically, when it is considered that a force of the fractional frequency fc/2 is generated between the fingertip and the surface of the top panel 120, the force is given near the center of the top panel 120 or the like. Next, such a situation is analyzed by the simulation.

Figure 17:
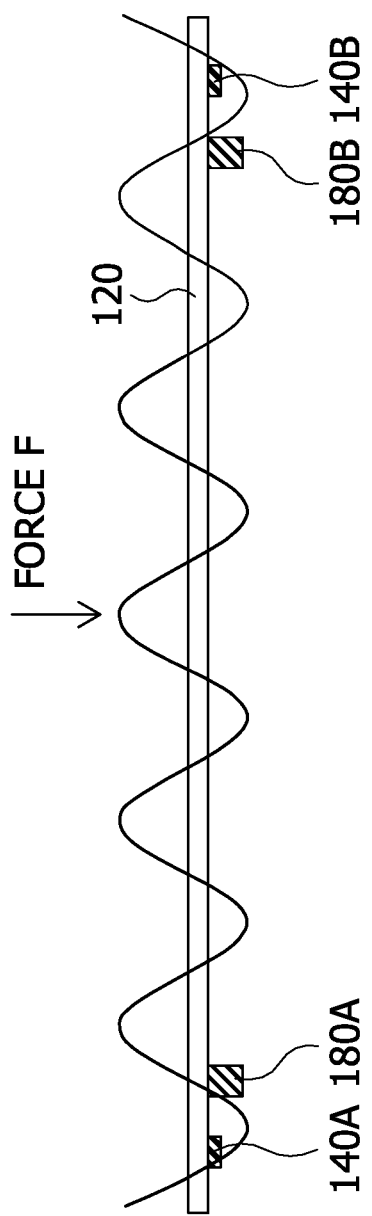
FIG. 17 is a view illustrating a simulation model.

FIG. 17 is a view illustrating a simulation model. In FIG. 17, the disposition of the top panel 120, the vibrating elements 140A and 140B, and the damping members 180A and 180B is the same as that of FIG. 12. As illustrated in FIG. 17, the vibration of the top panel 120 was analyzed in a case where a periodic force F of the fractional frequency fc/2 was applied to the center of the top panel 120.

Figure 18:
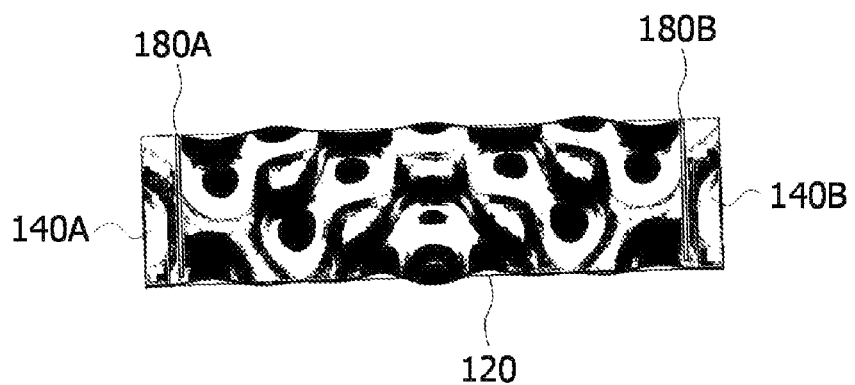
FIG. 18 is a view illustrating an analysis result of the vibration of the touch panel in a case where a force of the fractional frequency is applied to the center of the touch panel.

FIG. 18 is a view illustrating an analysis result of the vibration of the top panel 120 in a case where the periodic force F of the fractional frequency fc/2 was applied to the center of the top panel 120. In FIG. 18, the positions at which the damping members 180A and 180B are disposed are the same as those in FIG. 13.

Figure 19:
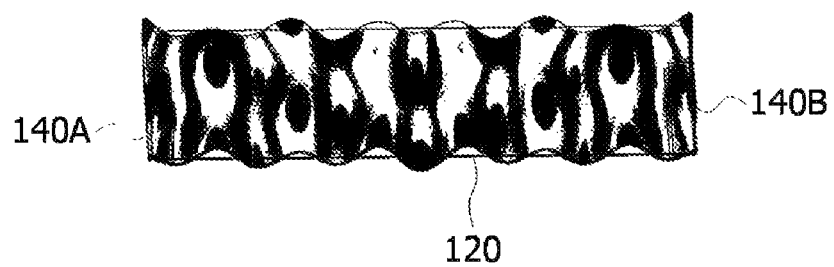
FIG. 19 is a view illustrating an analysis result of the vibration of the touch panel in a case where the force of the fractional frequency is applied to the center of the touch panel under the condition that the damping member is absent.

FIG. 19 is a view illustrating an analysis result of the vibration of the top panel 120 in a case where the periodic force F of the fractional frequency fc/2 was applied to the center of the top panel 120 under the condition that the damping members 180A and 180B are absent. In addition, in the simulation for obtaining the analysis results of FIGS. 18 and 19, the vibrating elements 140A and 140B are not driven.

The distributions of the vibrations illustrated in FIGS. 18 and 19 are different from each other, but the amplitude of the vibration illustrated in FIG. 18 is 0.4 times the amplitude of the vibration illustrated in FIG. 19. In FIG. 18, the damping members 180A and 180B function as boundaries, and a mode different from that in FIG. 19 is generated, and accordingly, a damping effect as large as the vibration illustrated in FIG. 15 may not be obtained. However, it has been found that the damping members 180A and 180B exert a certain damping effect with respect to the vibration of the fractional frequency fc/2 generated by the contact between the fingertip and the top panel 120.

Although the analysis results in a case of generating the vibration of fractional frequency fc/2 are illustrated in FIGS. 18 and 19, it is considered that the same tendency may also be obtained in a case of other fractional frequencies.

In addition, in FIGS. 15 and 18, the analysis results in a case where the damping members 180A and 180B are disposed at the position of the second node from the end portion of the top panel 120 are illustrated. Since the position of the second node from the end portion has a larger amplitude of the standing wave of the fractional frequency than that at the position after the third node from the end portion as illustrated in FIGS. 8 and 11, it is considered that the effect of attaching the damping members 180A and 180B is the largest, but it is considered that the there is a similar tendency even in a case where the damping members 180A and 180B are disposed at the positions after the third node.

In addition, it is inevitable that the damping members 180A and 180B are positioned in a certain range in the Y-axis direction from the position of the node so as not to attenuate the vibration of the fundamental standing wave. In the simulation performed to obtain the analysis result of FIG. 13, the width of the damping members 180A and 180B in the Y-axis direction is less than 10% of the wavelength of the fundamental frequency. In other words, the width of the damping members 180A and 180B in the Y-axis direction covers the range of approximately ±5% of the wavelength with respect to the position of the node in the Y-axis direction. In the disposition of the damping members 180A and 180B, no attenuation occurred in the fundamental standing wave.

For example, in a case of using a glass plate as the top panel 120 and generating the fundamental standing wave with a frequency of an ultrasonic wave band of approximately 30 kHz to 40 kHz, the wavelength of the bending vibration is 10 mm or more. The width of the damping members 180A and 180B in the Y-axis direction may be smaller than the wavelength of the fundamental standing wave, and is set to be 1 mm or less of approximately 1/10 of the wavelength. In addition, when the attaching positions of the damping members 180A and 180B deviate from the calculated position of the node, it becomes difficult to generate the fundamental standing wave, and thus, it is inevitable to suppress an error in the position in the Y-axis direction. In a case where the width of the damping members 180A and 180B in the Y-axis direction is 0.8 mm, when the error at the positions of the damping members 180A and 180B is within ±0.2 mm, the width is within ±0.25% of the wavelength of the fundamental standing wave when the position deviates from the node. In this case, it becomes half within ±5% described above.

Further, in another simulation, it was found that a large attenuation does not occur to the fundamental standing wave when the position of the damping members 180A and 180B in the Y-axis direction is within ±8% of the wavelength with respect to the position of the node.

From the above, when the damping members 180A and 180B are disposed within ±8% of the wavelength with respect to the position of the node in the Y-axis direction, including the widths and attaching errors of the damping members 180A and 180B, it is possible both to ensure the amplitude of the fundamental standing wave and to attenuate the standing wave of the fractional frequency.

As described above, by disposing the damping members 180A and 180B at the positions of the nodes of the top panel 120, it is possible to attenuate the standing waves of the fractional frequency while ensuring the amplitude of the fundamental standing wave.

For example, in a case where the frequency of the fundamental standing wave is 30 kHz or 40 kHz in the ultrasonic wave band, the fractional frequency of ½ or ⅓ or less of the fundamental standing wave is a frequency in the audible range less than 20 kHz. Therefore, it is possible to attenuate the sound in the audible range. In a case where the sound in the audible range is not attenuated, the sound may be heard as noise.

Therefore, according to the embodiment, it is possible to provide the electronic device 100 in which the noise in the audible range is suppressed. In particular, by disposing the damping members 180A and 180B at the position of the second node from the end portion of the top panel 120, it is possible to suppress the noise in the audible range more effectively.

In addition, in the above, although an aspect in which the damping members 180A and 180B are provided between the recess portion 110A of the housing 110 and the top panel 120 has been described, the damping members 180A and 180B may be provided between the touch panel 150 and the top panel 120. In addition, in a case where the touch panel 150 is disposed on the Z-axis negative direction side of the display panel 160, the damping members 180A and 180B may be provided between the display panel 160 and the top panel 120. In these cases, in a case where the damping members 180A and 180B are positioned in a display region of the display panel 160 in an XY plan view, the damping members 180A and 180B may be made of a transparent resin or the like. In addition, in a case where the damping members 180A and 180B are provided between the display panel 160 and the top panel 120, the touch panel 150 and the top panel 120 may be integrated.

In addition, in the above, an aspect in which the damping members 180A and 180B are disposed such that the end portion (lower end) on the Z-axis negative direction side is bonded to the surface of the recess portion 110A on the housing 110, and the end portion (upper end) on the Z-axis positive direction side abuts against the surface on the Z-axis negative direction side of the top panel 120, has been described.

However, when the positions of the damping members 180A and 180B are fixed, the lower ends of the damping members 180A and 180B may not be bonded, and for example, may be fixed in a state where of being sandwiched and pressed between the top panel 120 and the housing 110.

In addition, the upper ends of the damping members 180A and 180B may be fixed to the top panel 120 by bonding or the like. Further, a fixing member for fixing the damping members 180A and 180B may be used.

Above, although the electronic device according to the embodiment of the disclosure has been described, the disclosure is not limited to the specifically disclosed embodiment, and various modifications and variations are possible without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
    a top panel configured to have an operation surface;
    a position detection circuit configured to detect a position of an operation input performed on the operation surface;
    a vibrating element circuit configured to be attached to the top panel to generate vibration on the operation surface;
    a drive control circuit configured to drive the vibrating element circuit by a driving signal for generating natural vibration of an ultrasonic wave band on the operation surface, in which the driving of the vibrating element circuit is performed such that an intensity of the natural vibration changes in accordance with the position of the operation input to the operation surface and a temporal change degree of the position; and
    a damping member configured to abut against a position that corresponds to a node of a standing wave generated by the natural vibration on a surface opposite to the operation surface of the top panel,
    wherein the position of the damping member also corresponds to an antinode of a fractional wave of the standing wave having a fractional frequency of $f_c/M$, wherein M is an integer and $f_c$ is a frequency of the standing wave.

2. The electronic device according to claim 1,
    wherein the damping member is fixed to the member.

3. The electronic device according to claim 1,
    wherein the member is a display or a housing of the electronic device.

4. The electronic device according to claim 1,
    wherein the damping member is fixed to the opposite surface.

5. The electronic device according to claim 1,
    wherein the node of the standing wave is an N-th (N is an integer of 1 or more) node from an end of the top panel.

6. The electronic device according to claim 5,
    wherein N is equal to two such that the position of the damping member is located at the second node of the standing wave from the end of the top panel.

7. The electronic device according to claim 1, wherein M is equal to four.

* * * * *